May 23, 1944.    R. T. HOSKING    2,349,592
SELF-LOCKING SCREW DEVICE
Filed April 22, 1940
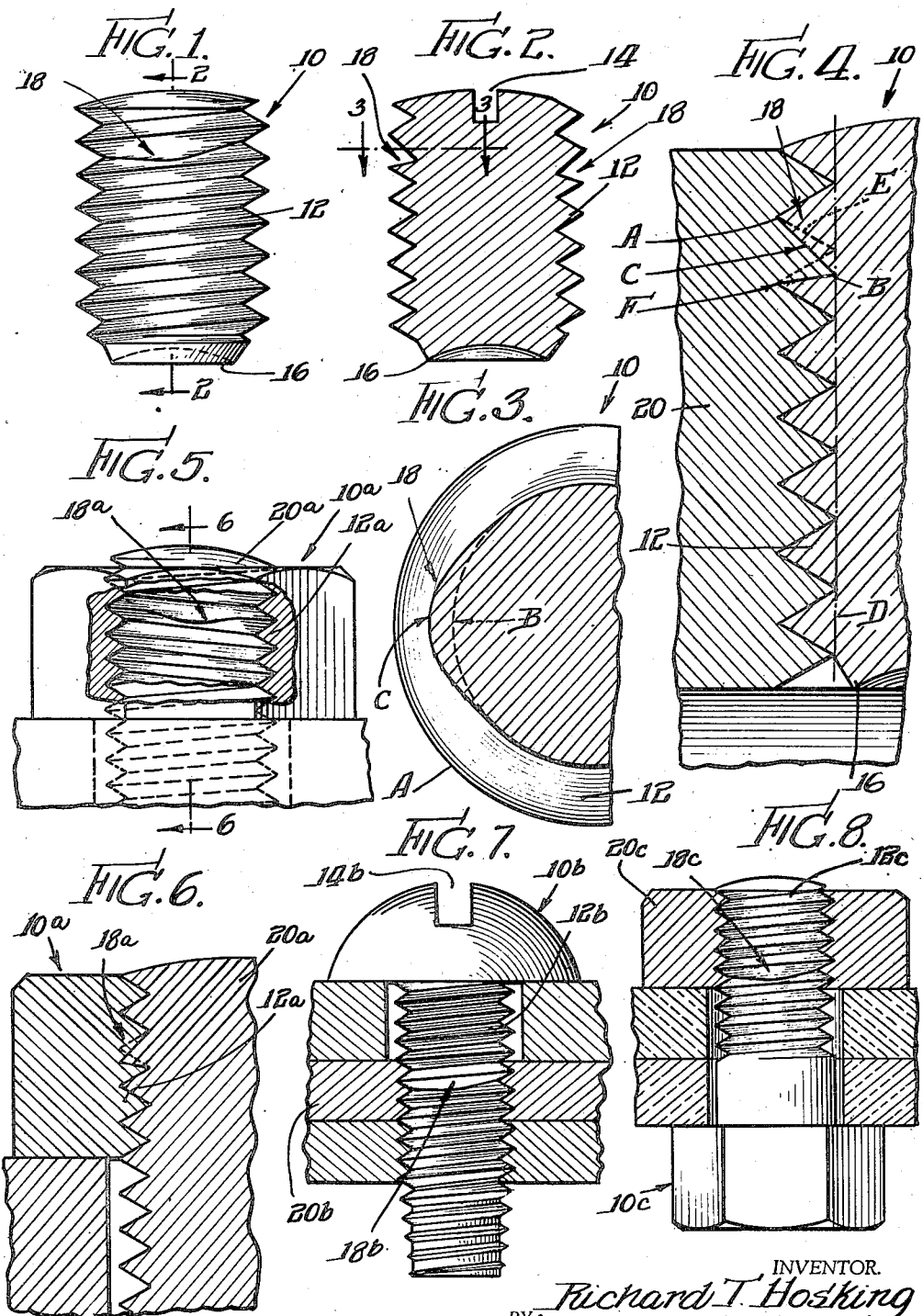
INVENTOR.
Richard T. Hosking
BY: Cox & Moore
ATTORNEYS Patented May 23, 1944

2,349,592

UNITED STATES PATENT OFFICE 2,349,592

SELF-LOCKING SCREW DEVICE

Richard T. Hosking, Wilmette, Ill., assignor, by mesne assignments, to Illinois Tool Works, Chicago, Ill., a corporation of Illinois Application April 22, 1940, Serial No. 330,813

5 Claims. (Cl. 151—32)

This invention relates generally to thread locking devices and more particularly to threaded fasteners adapted to effect axial shifting of a complementary thread section and thereby render the fastener self-locking.

It is an important object of the present invention to provide a thread locking device or self-locking fastener wherein a portion or section of the thread of the fastener is provided with an offset area capable of co-acting with a complementary section of thread so as to effect axial displacement thereof and thus secure the parts against inadvertent relative rotation.

More specifically, the invention contemplates a screw element such as a threaded fastener in which a section of the thread convolution is offset at its base so that when the fastener is applied to a complementary threaded element a section of the thread in said complementary element will be forced axially and thereby increase frictional engagement between complementary thread convolutions so as to secure the parts against loosening.

It is a further object of the invention to provide a thread locking device which depends for its locking effectiveness upon a relatively rigid offset or misaligned section located at the strongest part of the screw thread, to-wit, at the base thereof, co-acting with the complementary weaker portion of the thread in the complementary element so as to insure displacement of said weaker portion into frictional binding association with said offset portion.

The invention also comprehends the provision of a locking device of the type set forth above which may be very economically produced, it being contemplated to provide the aforesaid offset thread portion simultaneously with a thread rolling operation, thereby eliminating the necessity of a separate operation to provide said offset portion.

It is a further object of the present invention to provide locking devices or fasteners as set forth above which may be of either the hardened or unhardened variety, depending upon the nature of the environment in which the invention is to be employed.

The foregoing and numerous other objects and advantages will be more apparent from the following detailed description when considered in connection with the accompanying drawing, wherein—

Fig. 1 is a side elevational view of a set screw embodying the self-locking feature contemplated by the present invention;

Fig. 2 is a vertical central sectional view of the aforesaid set screw taken substantially along the line 2—2 of Fig. 1;

Fig. 3 is a fragmentary enlarged horizontal sectional view taken substantially along the line 3—3 of Fig. 2 to more clearly illustrate the offset section of the thread convolution which co-acts with a complementary thread convolution in the work to secure the set screw against inadvertent retrograde rotation;

Fig. 4 is an enlarged vertical sectional view of the left portion of the screw as shown in Fig. 2 in operative association with a work piece;

Fig. 5 discloses the application of the present invention to a threaded fastener such as a nut, a portion of the nut and screw element associated therewith being broken away to more clearly illustrate the portion of the thread in the nut which is offset;

Fig. 6 is a fragmentary sectional view taken substantially along the line 6—6 of Fig. 5 to more clearly illustrate the functioning of the offset thread portion in the nut in shifting a complementary portion of the thread on the screw;

Fig. 7 discloses the application of the present invention to a thread forming screw; and Fig. 8 illustrates the application of the invention to a bolt shank, the nut and work associated therewith being disclosed in section so as to more clearly illustrate the offset portion of the threaded bolt shank which causes axial displacement of the complementary thread convolution in the nut.

Referring now to the drawing wherein like numerals have been employed to designate similar parts throughout the various figures, it will be seen that Figs. 1 to 4, inclusive, disclose one practical application of the invention, namely, the application thereof to threaded devices such as set screws. The set screw in these figures is designated generally by the numeral 10, said set screw including a threaded body 12 which is provided with a conventional slot 14 at its upper end to receive a turning tool such as a screw driver. The lower extremity of the set screw is provided with an edge 16 designed to firmly embed itself when the screw is tightened against the work surface. Particular attention is directed to what I prefer to designate as a locking section of the screw, said section being designated generally by the numeral 18. In the disclosed embodiment I have shown a pair of diametrically opposed locking sections 18.

The locking sections 18 may be said to constitute offset portions or sections of the normal thread convolution or in other words sections of the thread which diverge both in circumferential and transverse cross-section from the normal surface contour of the conventional thread. The manner in which each locking section 18 diverges in circumferential cross-section is clearly indicated in Fig. 3 and the manner in which the locking section diverges in transverse cross-section from the normal thread form is clearly illustrated in Figs. 2 and 4. It will be noted that the maximum degree of divergence or offset relationship occurs at the base of the thread convolution. Thus, there is no misalignment or divergence from the normal thread contour along the outer periphery of the thread convolution as clearly indicated in Figs. 1, 2 and 4.

It will thus be apparent that divergence from the normal included angle of the thread at the central portion of the locking section begins at a point designated by the letter A in Fig. 4 which is in helical alignment with the periphery of the normal thread on the screw and extends to a point B, which designates the point of maximum divergence from the normal thread surface. The letter C designates a point of divergence intermediate the points A and B through which a section is taken to illustrate Fig. 3 of the drawing.

Referring to Figs. 1 and 3, it will be seen that the opposite circumferential extremities of the thread section 18 merge or blend into the normal surface contour of the thread on the screw body. Although the locking section 18 partakes of or presents a misaligned or offset portion of the normal thread convolution, it will be observed that the root diameter of the screw threads remains constant. That is to say, the depth to which the valleys between the thread convolutions extend remains constant as indicated by the dot and dash line D of Fig. 4.

When the screw 10 is inserted within the complementary thread convolutions of a work piece 20, Fig. 4, and the locking sections 18 are rotated into engagement with the complementary thread portions of the work, the thread in the work is shifted from the dotted line area indicated by the letter E to the solid line area defined by the lines AB and BF. In other words, the locking sections 18 are so disposed that the strongest portion of the thread in the screw, to-wit, the base portion, functions to axially shift the weaker portion of the thread in the work, to-wit, the top portion, from the dotted to the solid line position shown in Fig. 4. This serves to sufficiently increase frictional resistance to force, tending to rotate the screw in a retrograde direction; in fact, this action of the stronger or rigid portion of the thread in the screw or fastener element upon the weaker section of the thread in the work establishes a very firm frictional grip between the locking section of the fastener and the displaced portion of the thread in the work; furthermore, the shifting of the portion of the thread in the work out of its normal helical alignment with respect to the remaining portion of the thread convolutions in the work develops a sufficient increase in frictional resistance to withstand vibrations and the like, tending to loosen the screw fastener.

The invention obviously is not limited in its application to set screws but is capable of numerous other adaptations in instances where it is desirable to secure associated threaded parts against inadvertent loosening. Thus, in Figs. 5 and 6 I have shown the practical application of the locking section 18 just described to an internally threaded fastener or nut designated generally by the numeral 10a. This nut 10a includes an internally threaded body portion 12a which is provided with a locking section designated generally by the numeral 18a. This locking section 18a conforms structurally and functionally with the locking sections 18 previously described, the only difference being that the locking section 18a is provided along an internal thread structure as distinguished from the external thread structure of the set screw 10. Thus, when the nut 10a is applied to a complementary threaded element or screw 20a, the locking section 18a is eventually brought into engagement with the external thread on the screw. In Fig. 6 I have shown the manner in which the locking section 18a operates to shift a portion or section of the thread convolution on the screw from the dotted line position to the solid line position. Here again the stronger portion of the thread in the fastener, to-wit, the base of the thread, engages the weaker portion of the thread on the screw 20a, to-wit, the top or narrow portion thereof. This causes the effective shifting or tilting of substantially the entire cross-sectional area of the portion of the thread in the screw engaged by the locking section 18a from the dotted to the solid line position indicated in Fig. 6. In both the screw 10 of Figs. 1 to 4, inclusive, and the nut 10a of Figs. 5 and 6, I prefer to locate the locking sections in the vicinity of the top of the fasteners so that the engagement of the locking sections with the complementary thread convolutions does not occur until the fasteners have been rotated for a considerable distance. By having the locking sections so disposed, no abnormal resistance to the application of the fasteners occurs until the fasteners approach the limit of their clamping movement.

In Fig. 7 I have shown the practical application of the present invention to another type of threaded device, namely, a thread forming screw which I have designated generally by the numeral 10b. This screw is provided with the usual threaded fastener or body 12b and is provided with a slot 14b on the head thereof to facilitate turning into a work piece. A locking section designated generally by the numeral 18b is provided which functions similarly to the locking section 18 previously described. This locking section 18b serves to shift a complementary section of the thread in the work piece 20b after the screw has been turned sufficiently to form a thread in the work piece. Screws of the type shown in Fig. 7 are usually hardened so as to facilitate the forming of a thread in the unthreaded aperture of the work piece. The present invention of course contemplates the use of hardened as well as unhardened locking sections. In instances where the nature of the application is such as to require a relatively hard locking section, it may be desirable to harden the fastener with which the locking section is associated or to limit the hardening to the vicinity in which the locking section is located.

Fig. 8 discloses still a further modification and practical application of the invention. In this disclosure a bolt 10c having a threaded body 12c is provided with a locking section 18c. In this instance a nut 20c which corresponds with the work piece 20 of Fig. 4, the screw 20a of Figs. 5 and 6 and the work piece 20b of Fig. 7 when approaching its final clamping position moves into engagement with the locking section or sections 18c. This causes the portion of the complementary thread in the nut 20c to be shifted as previously described in connection with the other modifications.

It should be understood that the size and shape of the bulge or hump of the locking sections may be varied to suit the nature of the work with which the screw device is to be used. Thus, in certain instances the offset portion or bulge on the screw thread may be just sufficient to spring the complementary thread section in the work an amount which is within the elastic limit of the work and thereby establish resilient frictional contact. Under such circumstances, the thread portion of the work which is engaged by the offset portion of the screw thread will spring back to its normal helical alignment with respect to the remaining portion of the work thread when the parts have been disassociated. On the other hand, the size and configuration of the bulge on the screw thread can be such as to effect a shifting of the thread in the work beyond its elastic limit but within the limits of ductility of the material of the work. Under such circumstances, the shifted or displaced portion of the thread in the work does not of itself spring back to normal helical alignment when the parts are disassociated but the action of the thread in the work and the complementary thread in the fastener device cause a positive shifting of the work thread back to helical alignment in response to retrograde rotation of the parts. In instances where the screw thread of the work is sprung within its elastic limit, frictional engagement is relied upon as the sole binding force, whereas when the work thread is shifted beyond its elastic limit, as just mentioned, there is a combination of frictional engagement and positive locking. That is, the shifted portion of the work presents an abutment or obstacle which must be positively shifted back to its normal position of helical alignment in order for retrograde rotation to be imparted to the fastener.

From the foregoing it will be apparent that the present invention contemplates a very practical self-locking screw threaded device which may be economically produced by employing practical machine shop methods. It will also be apparent that screws and similar threaded fastening devices constructed in accordance with the teachings of the present invention are free from unsightly and impractical spring locking devices or flexed thread sections. In other words, a screw constructed in accordance with the present invention may be inserted without requiring the distortion of the thread part beyond its elastic limit. That is to say, by having a locking device of the type contemplated hereby, which is of a rigid nature, associated with the strongest part of the screw thread, namely, at the base thereof, no portion of the fastener element need be flexed, distorted or sprung in order to secure it against inadvertent retrograde rotation. It will also be apparent from the foregoing description that a screw equipped with a locking device or locking devices as described herein may be used over and over again without destroying the locking effectiveness thereof. Likewise, the same screw may be reinserted within the same threaded aperture time and time again without fatiguing the metal of the work. When the threaded fastener is removed from its threaded counterpart the previously deformed or axially shifted thread is automatically shifted back to its original position in helical alignment with the thread convolutions of the fastener. Also the locking device of the present invention functions to effectively secure a threaded fastener against loosening without the necessity of cutting or severing the material of the thread engaged thereby. In view of the fact that the outermost periphery of the screw or inner periphery of a nut equipped with a locking device of the type contemplated hereby remains in normal helical parallelism or alignment with the remaining portion of the screw thread, the ease with which the thread of the fastener will track or follow within the complementary valley of the part associated therewith is greatly enhanced. In other words, the threaded fastener is free from any peripheral irregularities which might interfere with the application and effective locking of the device. Obviously the number of locking devices used with each threaded fastener will depend to a large extent upon the degree of frictional resistance to rotation which is required and the particular environment in which the device is to be used.

It has been found that a screw equipped with a locking section of the type heretofore described may be used in cast iron as well as steel. Thus, the shifting action of the bulge portion on the side of the thread convolution of the screw will act upon a complementary thread section in a cast iron work piece so as to shift the cast iron mass without fracture thereof. In other words, the locking device of the present invention has practical utility in work pieces other than steel and similar flexible substances. It will also be apparent that the abruptness of the bulge or hump of the locking section will affect the locking characteristics of the device. Thus, in instances where a gradual displacement of the thread in the work is required the bulge or hump should be more gradual or in other words should extend over substantial circumferential extent of the thread convolution. In other instances, however, it may be advantageous to employ an offset portion or bulge of relatively short circumferential extent. This will be somewhat determined by the nature of the material of the work in which the screw device is to be inserted. A bulge or hump which is too abrupt might cause certain materials to fracture, whereas a more gradual hump could be used in the same work material without the danger of fracture.

Obviously, the invention is not limited to the specific disclosure herein but is capable of other modifications and changes without departing from the spirit and scope of the appended claims.

I claim:

1. A self-locking screw threaded device including a threaded body, and a locking section including rigid thread shifting means integral with and offset from the normal helical contour of a thread convolution of said body, and adapted when rotatably associated with a complementary threaded member to effect axial displacement of the thread in said complementary member so as to increase resistance of the engaged thread areas to relative retrograde rotation, said rigid thread shifting means and the thread portion from which it is offset presenting in combined transverse cross-section an area greater than the cross-sectional area of the normal thread convolution, said offset extending from the crest to the base of the associated thread convolution.

2. A self-locking screw threaded device including a threaded body, and a locking section including rigid thread shifting means offset from the normal helical contour of a thread convolution of said body, and adapted when rotatably associated with a complementary threaded member to effect axial displacement of the thread in said complementary member so as to increase resistance of the engaged thread areas to relative retrograde rotation, said rigid thread shifting means forming an integral part and extending peripherally of a thread convolution of said body and at opposite circumferential extremities blending into the normal contour of said thread convolution, said thread shifting means and its associated integral thread structure in transverse cross-section presenting an included angle at the crest which is greater than the included angle of the normal thread on said body.

3. A self-locking screw device including a threaded body, and a locking section forming a part of but having a surface diverging from the helical contour of the normal thread convolution of said body, said surface diverging from the top to the base, the point of maximum divergence being in the vicinity of the base thereof, said shifting means being adapted when rotatably associated with a complementary threaded member to effect axial displacement of the top or narrow portion of a complementary thread so as to increase resistance of the engaged thread areas to relative retrograde rotation.

4. A self-locking screw device including a threaded body, and a rigid locking section constituting a bulge portion integral with and extending beyond the side surface of a normal thread convolution of said body and extending from the crest to the base of said convolution, whereby when said bulge portion is rotatably associated with a complementary threaded member, axial displacement of the thread in said complementary member will take place so as to increase resistance of the engaged thread areas to retrograde rotation.

5. A self-locking screw threaded device including a threaded body, and a locking section including rigid thread shifting means offset from the normal helical contour of a thread convolution of said body, and adapted when rotatably associated with a complementary threaded member to effect axial displacement of the thread in said complementary member so as to increase resistance of the engaged thread areas to relative retrograde rotation, said rigid thread shifting means and the thread portion from which it is offset presenting in combined transverse cross-section an area greater than the cross-sectional area of the normal thread convolution and an included angle at the crest which is greater than the included angle of the normal thread, the root diameter in the vicinity of said locking section being no greater than the root diameter of the normal thread convolutions.

RICHARD T. HOSKING.